Patented Oct. 14, 1941

2,259,339

UNITED STATES PATENT OFFICE 2,259,339

RUBBER HYDROCHLORIDE COMPOSITION

Samuel D. Gehman, Akron, Ohio, assignor to Wingfoot Corporation, Wilmington, Del., a corporation of Delaware No Drawing. Application November 28, 1939, Serial No. 306,509

1 Claim. (Cl. 260—727)

This invention relates to a composition of rubber hydrochloride and balata hydrochloride or any other hydrochloride of a high polymeric material compatible with rubber hydrochloride. More particularly it relates to a thin film of such a composition.

A film of rubber hydrochloride has been produced commercially for several years. Such a film has found wide acceptance in the manufacture of articles of clothing such as raincapes, aprons, etc. and related articles such as shower curtains, umbrellas, etc.

The present invention relates to an improvement in such films whereby the films are materially softened and made more pliable and more acceptable for such uses as those mentioned above and other like uses. It is my understanding that all the presently known plasticizers for rubber hydrochloride bleed out in the course of time, and plasticized films therefore become hard. A film of rubber hydrochloride and a material such as balata hydrochloride or the like will also harden over a period of time due to aging, but the process will be much slower than the bleeding out of a plasticizer. The invention therefore consists in a composition comprising rubber hydrochloride and as a plasticizer a hydrochloride of balata or other high polymeric material.

According to a preferred form of this invention a composition which comprises substantially equal parts by weight of rubber hydrochloride and balata hydrochloride is employed. A film made from such material is amorphous as shown by X-ray defraction patterns. It is heat-sealable; i. e., overlapping surfaces of the film may be united by heating and pressing them together. The tensile strength of such a film may be increased by stretching it. This is preferably done by heating, stretching, and then allowing the film to cool under tension. The film of this invention has high tear-resistance, such as is imparted to rubber hydrochloride films by the addition of plasticizers, such as butyl stearate and dibutyl phthalate. It may be used to advantage where such plasticized rubber hydrochloride films are now desired. It may also be used in the packaging of foodstuffs, etc. where the previously known plasticized films cannot be used because the plasticizers used in them impart an objectionable taste to foodstuffs, etc. It may be used to advantage in the packaging of materials of irregular shape.

The invention however, is not limited to film made from equal weights of the two hydrochlorides, as the amount of rubber hydrochloride and balata hydrochloride may be varied. For example, the film may contain 25% balata hydrochloride and 75% rubber hydrochloride. Such a film is crystalline when made from crystalline rubber hydrochloride.

It is thus obvious that the new compositions may comprise 20% or more of rubber hydrochloride and of balata hydrochloride and the total of the balata hydrochloride and rubber hydrochloride preferably equals 85 to 90% or more of the total composition of the product. For example, the rubber hydrochloride and balata hydrochloride may be present in equal amounts and may contain 10% of a light inhibitor, coloring matter, etc. On the other hand, the composition may contain 20% of balata hydrochloride, 70% of rubber hydrochloride and 10% of fillers.

The compositions may be prepared in the usual way and may be cast into films in the manner now employed for casting rubber hydrochloride. For example, purified balata and rubber may be separately dissolved in benzene or the two may be dissolved in the same batch of solvent. The mixture may then be hydrochlorinated by passing HCl gas through the solution preferably at a temperature of about 10° C. In this way the mixture is hydrochlorinated. In order to produce a non-tacky mixture the hydrochlorination should be continued until the rubber contains about 29.5% or more of chlorine. An advantageous method of hydrochlorination comprises saturating the solution with an excess of 50% of hydrogen chloride over that required for theoretical hydrochlorination.

The solution of mixed hydrochlorides to which inhibitors, soluble or insoluble coloring matter, etc. may be added as desired is then cast into film. This may be done on a metal surface or on a suitably coated cloth belt. On evaporation of the solvent a film is obtained. If a high boiling solvent is used, a clear transparent film will be obtained.

I claim:

A thin film or foil composed essentially of rubber hydrochloride and balata hydrochloride.

SAMUEL D. GEHMAN.